United States Patent
Bitto et al.

(10) Patent No.: US 12,436,013 B2
(45) Date of Patent: Oct. 7, 2025

(54) MODULAR CORIOLIS FLOWMETER

(71) Applicant: Endress+Hauser Flowtec AG, Reinach (CH)

(72) Inventors: Ennio Bitto, Aesch (CH); Benjamin Schwenter, Ettingen (CH); Marc Werner, Grenzach-Wyhlen (DE); Johan Pohl, Freiburg (DE)

(73) Assignee: Endress+Hauser Flowtec AG, Reinach (CH)

( * ) Notice: Subject to any disclaimer, the term of this patent is extended or adjusted under 35 U.S.C. 154(b) by 270 days.

(21) Appl. No.: 18/256,858

(22) PCT Filed: Nov. 26, 2021

(86) PCT No.: PCT/EP2021/083186
§ 371 (c)(1),
(2) Date: Jun. 9, 2023

(87) PCT Pub. No.: WO2022/122420
PCT Pub. Date: Jun. 16, 2022

(65) Prior Publication Data
US 2024/0027251 A1      Jan. 25, 2024

(30) Foreign Application Priority Data
Dec. 10, 2020 (DE) .............. 10 2020 132 986.5

(51) Int. Cl.
*G01F 1/84* (2006.01)

(52) U.S. Cl.
CPC .......... *G01F 1/8477* (2013.01); *G01F 1/8422* (2013.01); *G01F 1/8427* (2013.01)

(58) Field of Classification Search
CPC ..... G01F 1/8477; G01F 1/8422; G01F 1/8427
USPC ..................................... 73/861.354
See application file for complete search history.

(56) References Cited

U.S. PATENT DOCUMENTS

| | | | |
|---|---|---|---|
| 5,602,345 A * | 2/1997 | Wenger | G01F 1/8495 |
| | | | 73/861.357 |
| 10,209,113 B2 | 2/2019 | Young et al. | |
| 2003/0097881 A1 | 5/2003 | Schlosser et al. | |
| 2020/0116612 A1 | 4/2020 | Ruetten et al. | |

(Continued)

FOREIGN PATENT DOCUMENTS

| | | | |
|---|---|---|---|
| CN | 101858765 A | 10/2010 | |
| CN | 102227618 A | 10/2011 | |
| CN | 105849510 A | 8/2016 | |

(Continued)

*Primary Examiner* — Nathaniel T Woodward
(74) *Attorney, Agent, or Firm* — Christopher R. Powers; Endress+Hauser (USA) Holding, Inc.

(57) ABSTRACT

A modular Coriolis flowmeter includes: a measuring tube module, including a measuring tube for guiding the medium, an excitation magnet on a vibration exciter for exciting the measuring tube, and a sensor magnet on a vibration sensor for detecting a vibration of the measuring tube; a receiving module including a receptacle for receiving the measuring tube module, an excitation coil on the vibration exciter, a sensor coil on the vibration sensor, and a receiving module body, including a ferromagnetic material and an opening, wherein a coil holder for the excitation coil and/or sensor coil is disposed in the opening, the coil holder including a coil holder body including an electrically insulating material.

15 Claims, 2 Drawing Sheets

(56) References Cited

U.S. PATENT DOCUMENTS

2020/0200582 A1* 6/2020 Skinkle ................ G01F 1/8468

FOREIGN PATENT DOCUMENTS

| CN | 111279162 A | 6/2020 |
|---|---|---|
| CN | 111670343 A | 9/2020 |
| DE | 102006020265 A1 | 10/2007 |
| DE | 102012201592 B3 | 3/2013 |
| DE | 102018105089 A1 | 9/2019 |
| EP | 1807681 A2 | 7/2007 |
| EP | 2568263 A1 | 3/2013 |
| JP | 2006337131 A | 12/2006 |
| JP | 2009020084 A | 1/2009 |
| JP | 2016045011 A | 4/2016 |
| WO | 2011099989 A1 | 8/2011 |

* cited by examiner

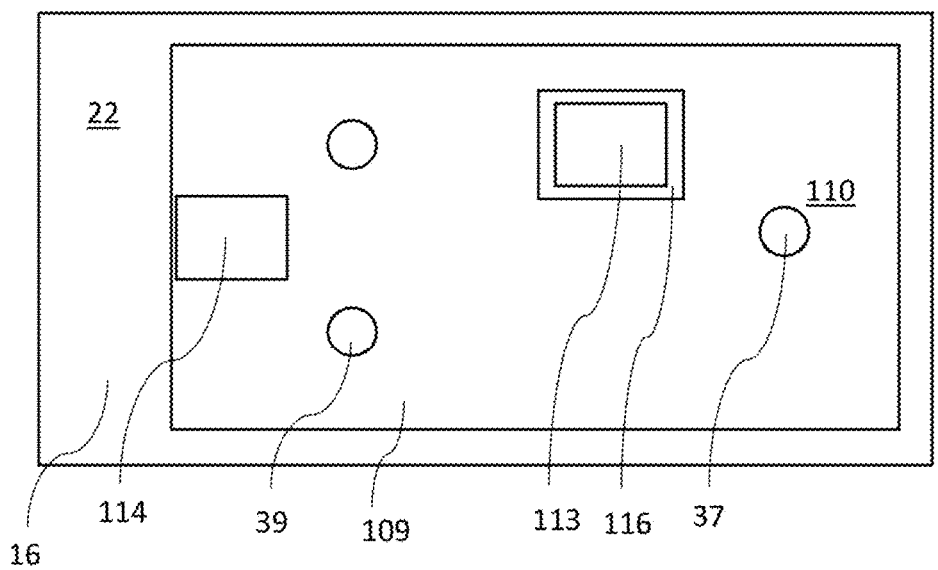
Fig. 3
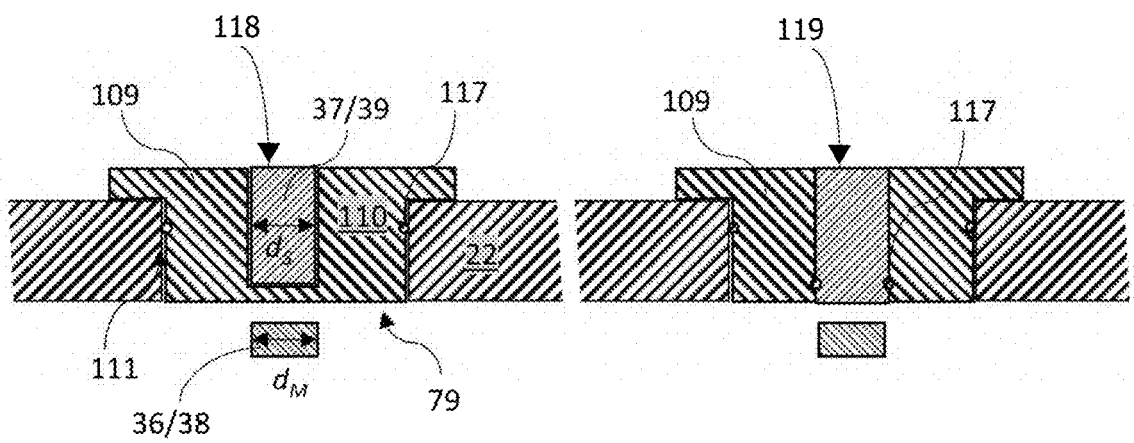
Fig. 4
Fig. 5
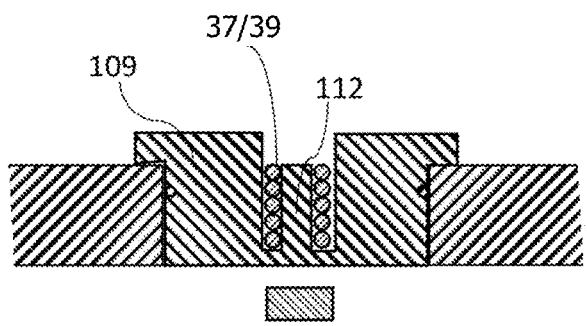
Fig. 6

MODULAR CORIOLIS FLOWMETER

CROSS-REFERENCE TO RELATED APPLICATIONS

The present application is related to and claims the priority benefit of German Patent Application No. 10 2020 132 986.5, filed Dec. 10, 2020, and International Patent Application No., filed PCT/EP2021/083186, filed Nov. 26, 2021, the entire contents of which are incorporated herein by reference.

TECHNICAL FIELD

The invention relates to a modular Coriolis flowmeter for determining a process variable of a flowable medium.

BACKGROUND

Process measurement technology field devices with a vibration-type sensor and especially Coriolis flowmeters have been known for many years. The basic structure of such a measuring device is described in, for example, EP 1 807 681 A1, wherein reference is made in full to this publication with respect to the structure of a generic field device within the scope of the present invention.

Typically, Coriolis flow meters have at least one or more vibratable measuring tubes which can be set into vibration by means of a vibration exciter. These vibrations are transmitted along the tube length and are varied by the type of flowable medium located in the measuring tube and by its flow rate. At another point on the measuring tube, a vibration sensor or, in particular, two vibration sensors spaced apart from one another can record the varied vibrations in the form of a measurement signal or a plurality of measurement signals. An evaluation unit can then determine the mass throughflow, the viscosity, and/or the density of the medium from the measurement signal(s).

Modular Coriolis flowmeters with interchangeable disposable measuring tube modules are known. For example, in WO 2011/099989 A1, a method is thus taught for producing a monolithically formed measuring tube arrangement of a Coriolis flowmeter with bent measuring tubes, wherein the measuring tube body for the respective measuring tubes is at first formed as a solid made up of a polymer, and the channel for conducting the flowable medium is subsequently machined into said solid. WO 2011/099989 A1, like U.S. Pat. No. 10,209,113 B2, teaches a connecting body that is configured to receive and support a replaceable measuring tube module with thin-walled plastic tubes. The measuring tube module is fastened via the connecting body in a receiving module equipped with the necessary exciters and sensors. Modular Coriolis flowmeters, in which the excitation coil and the sensor coils are arranged on a metallic housing and excitation and sensor magnets are used, are susceptible to parasitic influences when measuring the process variable in the event of magnetic field changes. These cannot be fully compensated by a factory adjustment.

SUMMARY

The object of the invention is to remedy this problem.
The object is achieved by the modular Coriolis flowmeter according to the present disclosure.

The modular Coriolis flowmeter according to the invention for determining a process variable of a flowable medium comprises:

a measuring tube module,
wherein the measuring tube module comprises at least one measuring tube for guiding the medium,
wherein the measuring tube module has at least one excitation magnet on a vibration exciter for exciting the at least one measuring tube,
wherein the at least one excitation magnet is arranged on the at least one measuring tube,
wherein the measuring tube module has at least one sensor magnet on an oscillation sensor for detecting an oscillation of the at least one measuring tube,
wherein the at least one sensor magnet is arranged on the at least one measuring tube,
a receiving module with a receptacle for receiving the measuring tube module,
wherein the receiving module has at least one excitation coil on the vibration exciter with an excitation coil winding that is in magnetic effect with the at least one excitation magnet,
wherein the receiving module has at least one sensor coil on the vibration sensor with a sensor coil winding that is in magnetic effect with the at least one sensor magnet,
wherein the receiving module comprises a receiving module body, which incorporates an electrically conductive and in particular ferromagnetic material at least in sections,
wherein the receiving module body has an inner lateral surface and an outer lateral surface,
wherein the receiving module body has at least one opening that extends from the inner lateral surface to the outer lateral surface,
wherein a coil holder for the excitation coil and/or sensor coil is arranged in the at least one opening,
wherein the coil holder comprises a coil holder body,
wherein the coil holder body incorporates an electrically insulating material, in particular formed from an electrically insulating material,
wherein the excitation coil winding has an excitation coil plane delimiting in the coil longitudinal direction and/or the sensor coil winding has a sensor coil plane delimiting in the coil longitudinal direction,
wherein the excitation coil plane and/or the sensor coil plane face the receptacle,
wherein the excitation magnet has an excitation magnet end face facing the at least one opening and/or the sensor magnet having a sensor magnet end face facing the at least one opening,
wherein the coil holder body extends at least in portions between the excitation coil plane and the excitation magnet end face and/or extending at least in portions between the sensor coil plane and the sensor magnet end face,
a measuring and/or operating circuit,
wherein the measuring and/or operating circuit is configured to apply an excitation signal to the at least one excitation coil,
wherein the measuring and/or operating circuit is configured to detect a sensor signal on the at least one sensor coil.

The time-varying magnetic field generated by the at least one excitation coil causes eddy currents in the electrically conductive, metallic receiving module or in an edge section around the opening for the excitation coil. The eddy currents cause a displacement of the zero point, which moreover depends on the density of the medium. The time-varying magnetic field generated by the at least one sensor magnet also causes eddy current in the receiving module body. This distorts the mass flow-dependent measurement signal, in particular the phase difference between two measurement signals measured at different sensor coils. Furthermore, the damping of the measurement signal increases. These parasitic influences can be compensated by the use of immersion coils (see U.S. Pat. No. 5,602,345) or by a precise factory adjustment. However, this is not possible with modularly constructed Coriolis flowmeters with exchangeable measuring tube modules. The structural configuration of the coil holder has the advantage that an exchange of the measuring tube module can be replaced and, at the same time, the induction of eddy currents is minimized.

Advantageous embodiment of the invention are the subject matter of the dependent claims.

One embodiment provides that the excitation coil and/or the sensor coil in particular each have a coil diameter $d_S$,
wherein the at least one opening has an opening lateral surface,
wherein the excitation coil and/or the sensor coil has a minimum distance of at least $1 \times d_S$, in particular at least $1.5 \times d_S$ and preferably at least $2 \times d_S$ from the opening lateral surface.

One embodiment provides that the excitation magnet and/or the sensor magnet in particular each have a magnetic diameter $d_M$,
wherein the measuring tube module is arranged in the receptacle on the receiving module such that the at least one excitation magnet and/or the at least one sensor magnet in particular each have a minimum distance of more than $2 \times d_M$, in particular at least $2.5 \times d_M$ and preferably of at least $3 \times d_M$ to the receiving module body, in particular to the opening lateral surface.

One embodiment provides that the coil holder is arranged close to fluids in the at least one opening.

This has the advantage that the receptacle can be cleaned when the receiving module is installed in a biotechnical system.

One embodiment provides that the coil holder is inserted from the outer lateral surface into the at least one opening and, in particular, is fastened.

One embodiment provides that exactly one coil holder is arranged in the at least one opening,
wherein the at least one excitation coil and the at least one sensor coil are arranged on the exactly one coil holder.

The advantage of the two above-mentioned developments is a simplification of assembly. In addition, the reduction of the number of openings reduces the potential for leakage.

One embodiment provides that the coil holder has a coil body for the at least one excitation coil and/or a coil body for the at least one sensor coil,
wherein the at least one excitation coil is formed by a winding of an electrical conductor on the coil body of the excitation coil and/or the at least one sensor coil is formed by a winding of an electrical conductor on the coil body of the sensor coil.

The coil holder and the coil body are preferably formed in one piece and the excitation coil and/or sensor coil is formed on the coil body by winding the coil wire.

One embodiment provides that the coil holder body extends at least in sections between an excitation coil plane that delimits the excitation coil in the longitudinal direction of the coil and an end face of the excitation magnet and/or extends at least in sections between a sensor coil plane for the sensor coil that delimits the sensor coil in the longitudinal direction of the coil and an end face of the sensor magnet.

The coil holder body preferably covers the opening and the excitation coil and/or sensor coil with respect to the receptacle relative to the electronic components arranged on the outer lateral surface of the receiving module body, such as the measuring and/or operating circuit.

One embodiment provides that the coil holder has, at least in sections, a material that is transparent to an optical sensor, in particular a temperature sensor,
wherein the sensor is arranged outside the receptacle on the receiving module body,
wherein the sensor is configured to determine a further process variable through the transparent section.

The transparent section is preferably designed as a tightly attached window on the coil holder. Thus, an optical temperature measurement can be realized from a side of the receiving module facing away from the receiving module. Another advantage of this is that the optical sensor is not exposed to either a cleaning agent nor a liquid.

One embodiment provides that the coil holder incorporates, at least in sections, a material which is permeable to radio waves, in particular with a frequency range of 30 to 500 kHz,
wherein the receiving module comprises an RFID reader,
wherein the measuring tube module comprises an RFID transponder.

Metallic housings have shielding properties against radio waves. However, in order to ensure an error-free start-up of the measuring tube module, it may be necessary to integrate an RFID reading device into the read-out module. It has therefore been found to be advantageous to design the coil holder at least in sections in such a way that an RFID transponder attached to the measuring tube module can be read out by the RFID reading device on the receiving module. This can be realized by tapering or by choosing a suitable material.

One embodiment provides that the measuring tube module can be connected to the receiving module in a mechanically releasable manner, in particular in a form-fitting and/or force-fitting manner.

One embodiment provides that the excitation coil and/or the sensor coil are in particular at least partially embedded in the coil holder.

This has the advantage that the service life of the excitation coil and/or of the sensor coil is significantly extended, since the ingress of moisture into the winding is made more difficult.

BRIEF DESCRIPTION OF THE DRAWINGS

The invention is explained in greater detail with reference to the following figures. The following are shown:

FIG. 3 shows a side view of the receiving module of FIG. 1 in a second embodiment of the modular Coriolis flowmeter;

FIG. 4 shows a partial view of a cross-section through a first embodiment of the coil holder;

FIG. 5 shows a partial view of a cross-section through a second embodiment of the coil holder; and FIG. 6 shows a partial view of a cross-section through a third embodiment of the coil holder.

DETAILED DESCRIPTION

Figure 1:
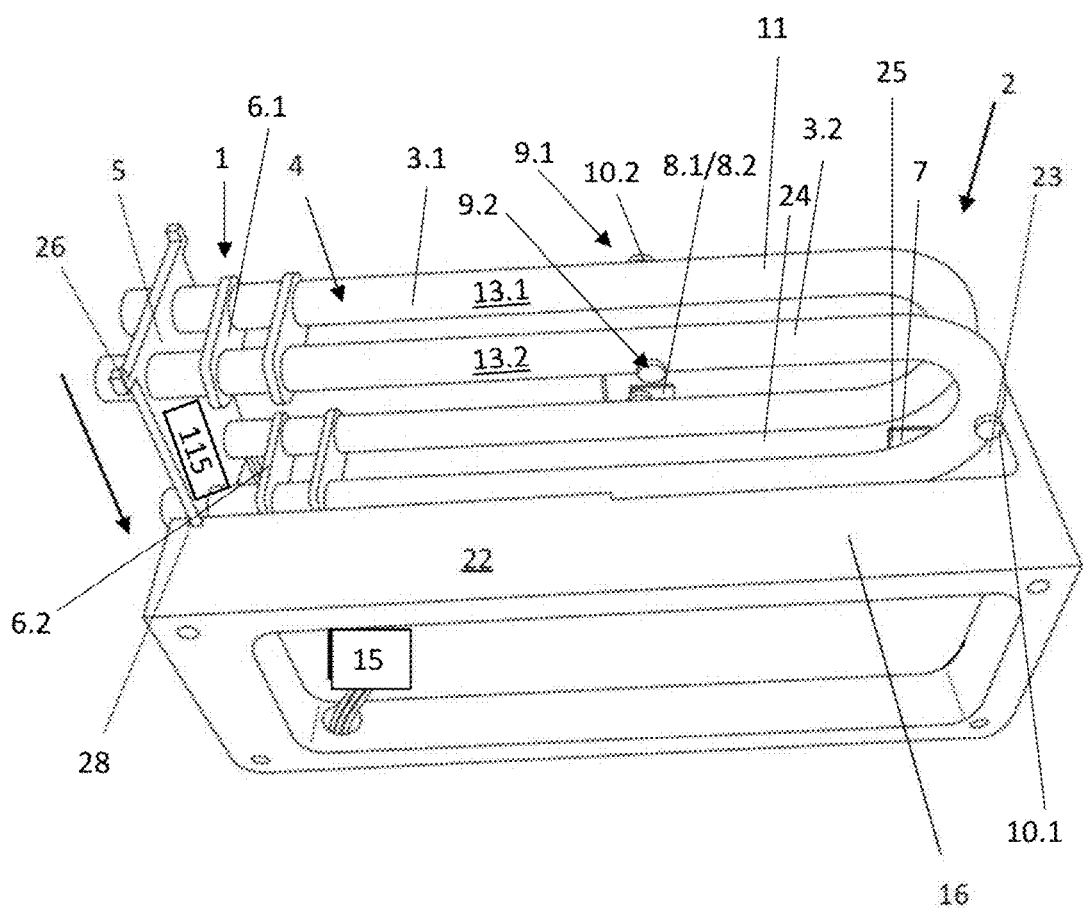
FIG. 1 shows a measuring tube module partially arranged in a receptacle on a receiving module.

FIG. 1 shows a perspective view of a modular Coriolis flowmeter for pharmaceutical bioprocessing applications. A Coriolis flowmeter is a measuring device 2 for detecting a mass flow rate, a viscosity, a density, and/or a variable derived therefrom, of a flowable medium The measuring tube module 4 is suitable for being inserted into a receptacle 23 on a receiving module 16 in such a way that it can be exchanged, i.e. it can be mechanically inserted and detached. For this purpose, only individual components of the vibration exciter and of the vibration sensors, in this case the respective magnet arrangements 9.1 and 9.2, are attached to the measuring tube module 4. The magnet arrangement 9.1 and 9.2 comprises at least one excitation magnet and at least one sensor magnet. According to the depicted embodiment, the two magnet arrangements 9.1 and 9.2 each include exactly one excitation magnet and exactly two sensor magnets. The further components are arranged in a receiving module 16, in particular in the receptacle 23—in particular in a coil receiving device on the receiving module body—which is suitable and designed for receiving the measuring tube module 4. The measuring tube module 4 comprises two bent measuring tubes 3.1 and 3.2 that run in parallel to one another and are connected to one another via a coupler arrangement 1 consisting of four coupler elements 6, and via a fixing body arrangement 5. Two coupler elements 6.1 are connected in an integrally bonded manner in an inlet, and two other coupler elements 6.2 are connected in an integrally bonded manner in the outlet of the respective measuring tubes 3.1 and 3.2. The measuring tubes 3.1, 3.2 are shaped such that the flow direction, represented by two arrows, in the inlet is oriented oppositely to the flow direction in an outlet. A flow divider that has a process connection for connecting to a hose system and/or plastic tube system can be respectively arranged in the inlet and in the outlet. According to one embodiment, precisely one flow divider body can be provided instead of two separate flow dividers, the flow divider body of which is slid onto the inlet and outlet and also contributes to decoupling the measuring tube module 4 from the environment after installation in the receiving module 16. The individual coupler elements 6 are plate-shaped and designed in one or two parts. The coupler elements 6 may respectively completely or only partially encompass the measuring tubes. The measuring tubes 3.1 and 3.2 are U-shaped, i.e., they respectively have two legs 11 that run substantially in parallel to one another and are connected via a bent partial segment. A magnet arrangement 9.1, 9.2 is arranged on each measuring tube 3.1, 3.2. In the bent partial segment, a magnet 10.1—in particular an excitation magnet—of the magnet arrangement 9.1 is arranged and forms a component of the vibration exciter. In each of the two legs 11, a magnet 10.2—in particular a sensor magnet—is attached, which forms part of the vibration exciter. The magnets are attached to attachment surfaces. In the embodiment, the attachment surfaces are located on the respective measuring tubes 3.1, 3.2.

The measuring tube module 4 is partially inserted into a receptacle 23 on a receiving module 16. An arrow indicates the insertion direction. In the embodiment, the latter runs perpendicularly to a longitudinal direction of the receptacle 23. The receptacle can also be designed such that the measuring tube module 4 can be inserted in the longitudinal direction of the receptacle (see FIG. 2A to C). The receiving module 16 has a measuring and/or operating circuit 15 that is connected to the vibration exciters and vibration sensors, in particular to the respective coil systems, and is configured to generate and/or detect a temporally alternating magnetic field that changes over time. The receiving module 16 has a receiving module body 22 in which the receptacle 29 is located. The connecting body 5 for the measuring tube module 4 has mounting surfaces 26 that serve to arrange the measuring tube module 4 in a predetermined position in the receiving module 16. According to the depicted embodiment, the perpendicular of the mounting surface 26 points perpendicularly in the longitudinal direction of the measuring tube module 4. According to a further advantageous embodiment, the perpendicular of the mounting surface 26 points in the direction of the longitudinal axis of the measuring tube module 4. The surface of the receiving module body 22 in contact with the mounting surface 26 of the connecting body 5 is the bearing surface 27.

The receiving module 16 has two side surfaces that are oriented in parallel to one another and delimit the receptacle 29 transversely in the longitudinal direction of the receptacle. The coil devices 25 on the vibration sensors 8.1 and 8.2 and the coil device 25 on the vibration exciter 7 are arranged in the side surfaces. The coil devices 25 on the vibration sensors 8.1 and 8.2 are arranged in the longitudinal direction of the receptacle with respect to the coil device 25 on the vibration exciter 7. All three coil devices 25 are located in one coil plane. Furthermore, the three coil devices 25 are designed as a plate coil and embedded into the side surface. Three coil devices 25 are essentially arranged on the side surface in such a way that they are located opposite the corresponding magnet arrangements 9.1 and 9.2 when the measuring tube module 3 is installed. A respective guide that extends perpendicularly in the longitudinal direction of the receptacle 29 and in parallel to the coil plane is incorporated into the two side surfaces. According to the depicted embodiment, the receptacle extends over two end faces of the receptacle 29. This enables the measuring tube module 4 to be inserted perpendicularly in the longitudinal direction of the measuring tube module 4. According to a further embodiment, the receptacle 23 extends exclusively over one end face. In this case, the measuring tube module 4 is to be inserted into the receiving module 16 in the longitudinal direction of the measuring tube module 4 or the receiving module 16. The excitation coils each have an excitation coil winding, which have a delimiting excitation coil plane in the coil longitudinal direction. In addition, the sensor coils each have a sensor coil winding, which comprises a sensor coil plane delimiting in the coil in the longitudinal direction. The excitation coil plane and/or the sensor coil plane face the receptacle 23. The excitation magnet has an excitation magnet end face facing the excitation coil and the sensor magnet has a sensor magnet end face facing the sensor coil. The excitation magnet end face is spaced apart from the excitation coil plane, as is the sensor magnet end face to the sensor coil plane. Measuring and/or operating circuit 15 is attached to the receiving module body 22 and is configured to apply an excitation signal to the excitation coils and to detect a sensor signal on the sensor coils. Furthermore, an RFID transponder 115 with a data memory—in which data specific to the measuring tube module are stored—is attached to the fixing body arrangement 5 for the measuring tube module 4. The RFID transponder 115 can be read by an RFID reading device. The RFID reading device can be attached to the receiving module 16 or be designed as a hand-held device.

Figure 2:
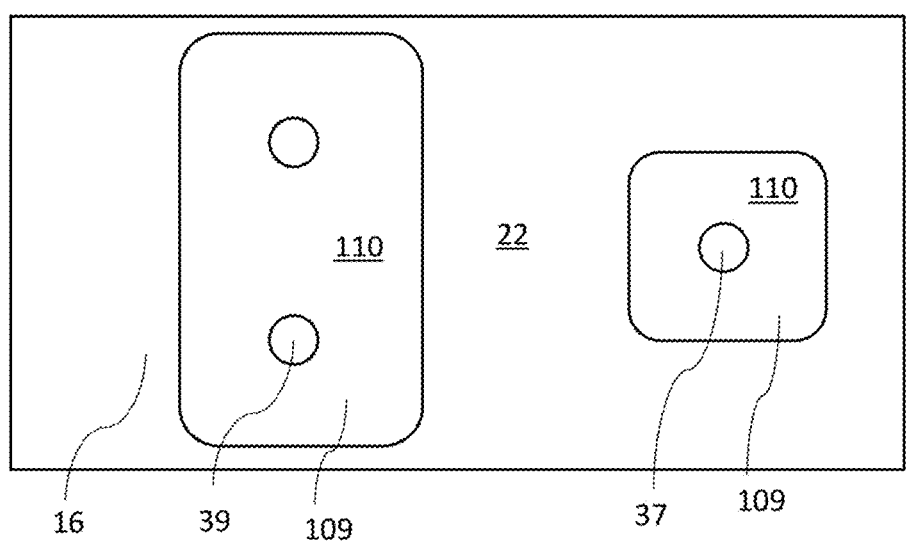
FIG. 2 shows a side view of the receiving module of FIG. 1 in a first embodiment of the modular Coriolis flowmeter.

FIG. 2 shows a side view of the receiving module 16 in a first embodiment of the modular Coriolis flowmeter for determining a process variable of a flowable medium. The receiving module 16 has a receptacle for receiving a measuring tube module. Furthermore, the receiving module 16 comprises two excitation coils 37 on the vibration exciter, each with one excitation coil winding, which each have a magnetic effect with the associated exciter magnet on the measuring tube module. The excitation coils 37 are arranged on different sides of the receiving module 16. In addition, the receiving module 16 comprises four sensor coils 39 on the vibration sensor, each with a respective sensor coil winding, which each have a magnetic effect with the associated sensor magnet. The receiving module 16 has a receiving module body 22, which incorporates an electrically conductive and in particular ferromagnetic material at least in sections. The receiving module body 22 has an inner lateral surface, an outer lateral surface and an opening 79, which extends from the inner lateral surface to the outer lateral surface. In the illustrated embodiment, the receiving module body 22 has two openings 79 on one side and second further openings on an opposite side. A coil holder 109 for the excitation coil 37 and/or the two sensor coils 39 are arranged in each of the two openings. The coil holders 109 each comprise a coil holder body 110, which has an electrically insulating material, or is formed from an electrically insulating material, such as, for example, plastic.

FIG. 3 shows a side view of the receiving module 16 in a second embodiment of the modular Coriolis flowmeter. The second embodiment differs from the first embodiment essentially in that the receiving module 16 has only exactly one opening 79 on the two opposite sides for exactly one coil holder 109. An excitation coil 37 and two sensor coils 39 are arranged in the coil holder 109. In addition, an RFID reader 114 is arranged on the coil holder 109 for determining measurement tube module-specific data stored in a data memory of an RFID transponder and an optical sensor 113, which optically detects the temperature or a variable dependent on the temperature of the at least one measuring tube and/or the medium to be guided through a transparent section 116 in the coil holder body 110.

FIG. 4 shows a partial view of a cross-section through a first embodiment of the coil holder 109, which is arranged and fastened in an opening 79 with an opening lateral surface 111 from the outer lateral surface. The opening lateral surface 111 delimits the opening 79 in the radial direction to the receiving module body 22. The coil holder 109 has a coil receptacle for the excitation coil 37 and/or sensor coil 39. The coil holder 109 has a coil holder body 110, which extends at least in section between the excitation coil plane and the excitation magnet end face and/or extends at least in sections between the sensor coil plane and the sensor magnet end face. According to the illustrated embodiment, the coil holder body 110 fills the opening, so that the excitation coil 37 and/or the sensor coil 39 is covered by the latter in the longitudinal direction. In order for the coil holder 109 to be arranged liquid-tight in the one opening, a sealant 117 is provided. The excitation coil 37 and/or the sensor coil 39 has a coil diameter of $d_S$. According to the invention, the excitation coil 37 and/or the sensor coil 39 has a minimum distance of at least $1 \times d_S$, in particular at least $1.5 \times d_S$ and preferably of at least $2 \times d_S$ to the opening lateral surface 111. Furthermore, the excitation magnet 36 and/or the sensor magnet 38 has a magnetic diameter of $d_M$. According to the invention, the measuring tube module is arranged in the receptacle on the receiving module such that the excitation magnet 36 and/or the sensor magnet 38 are at a minimum distance of more than $2 \times d_M$, in particular at least $2.5 \times d_M$ and preferably of at least $3 \times d_M$ to the receiving module body, in particular to the opening lateral surface. According to a development of the first embodiment, the coil holder 109 is an injection-molded part in which the excitation coil 37 and/or the sensor coil 39 is at least partially embedded. The coil holder 109 also has an at least partially circumferential and protruding edge portion, which rests on the outer side of the receiving module body 22.

FIG. 5 shows a partial view of a cross-section through a second embodiment of the coil holder 110. The second embodiment differs from the first embodiment essentially in the arrangement of the excitation coil 37 and/or sensor coil 39 in the coil holder body 110. The coil receptacle in the first embodiment is replaced by a passage opening in which the excitation coil 37 and/or the sensor coil 39 is arranged. In order to make the passage opening 119 tight against fluids from the receptacle, a further sealant 117 is provided.

FIG. 6 shows a partial view of a cross-section through a third embodiment of the coil holder 109. The third embodiment differs from the first embodiment essentially in that the excitation coil 37 and/or sensor coil 39 is not arranged in a coil receptacle. Instead of the coil holder, there is a coil body 112, which is monolithically connected to the coil holder body 110 and is used for winding up by a coil wire to form an excitation coil 37 and/or sensor coil 39.

The invention claimed is:

1. A modular Coriolis flowmeter for determining a process variable of a flowable medium, the flowmeter comprising:
    a measuring tube module, comprising:
        at least one measuring tube configured to convey the medium;
        at least one excitation magnet on a vibration exciter configured to excite vibrations in the at least one measuring tube, wherein the at least one excitation magnet is arranged on the at least one measuring tube; and
        at least one sensor magnet on a vibration sensor configured to detect a vibration of the at least one measuring tube, wherein the at least one sensor magnet is arranged on the at least one measuring tube;
    a receiving module, comprising:
        a receptacle configured to receive the measuring tube module;
        at least one excitation coil on the vibration exciter including an excitation coil winding in magnetic effect with the at least one excitation magnet;
        at least one sensor coil on the vibration sensor including a sensor coil winding in magnetic effect with the at least one sensor magnet; and
        a receiving module body, which includes an electrically conductive and ferromagnetic material, at least in sections, wherein the receiving module body includes an inner lateral surface and an outer lateral surface, wherein the receiving module body includes at least one opening that extends from the inner lateral surface to the outer lateral surface,
    wherein a coil holder for the excitation coil and/or sensor coil is disposed in the at least one opening, wherein the coil holder comprises a coil holder body, and wherein the coil holder body is made of an electrically insulating material,
    wherein the excitation coil winding has an excitation coil plane delimiting in the coil longitudinal direction and/or the sensor coil winding has a sensor coil plane delimiting in the coil longitudinal direction, wherein the excitation coil plane and/or the sensor coil plane face the receptacle,
    wherein the at least one excitation coil and the at least one sensor coil each have a coil diameter,
    wherein the at least one opening includes an opening lateral surface, wherein the excitation coil and/or the sensor coil each have a minimum distance from the opening lateral surface at least equal to the coil diameter, and wherein the at least one excitation magnet includes an excitation magnet end face facing the at least one opening and/or the sensor magnet includes a sensor magnet end face facing the at least one opening; and a measuring and/or operating circuit configured to apply an excitation signal to the at least one excitation coil and to detect a sensor signal on the at least one sensor coil.

2. The flowmeter of claim 1, wherein the coil holder body extends, at least in sections, between the excitation coil plane and the excitation magnet end face and/or extends, at least in sections, between the sensor coil plane and the sensor magnet end face.

3. The flowmeter of claim 1, wherein the wherein the excitation coil and/or the sensor coil has a minimum distance at least equal to twice the coil diameter from the opening lateral surface.

4. The flowmeter of claim 1, wherein the at least one excitation magnet and/or the at least one sensor magnet each have a magnetic diameter, wherein the measuring tube module is arranged in the receptacle such that the at least one excitation magnet and/or the at least one sensor magnet each have a minimum distance of more than two times the magnetic diameter to the opening lateral surface of the receiving module body.

5. The flowmeter of claim 4, wherein the measuring tube module is arranged in the receptacle such that the at least one excitation magnet and/or the at least one sensor magnet each have a minimum distance of more than three times the magnetic diameter to the opening lateral surface of the receiving module body.

6. The flowmeter of claim 1, wherein the coil holder is disposed in the at least one opening in a liquid-tight manner.

7. The flowmeter of claim 1, wherein the coil holder is inserted and fastened from the outer lateral surface into the at least one opening.

8. The flowmeter of claim 1, wherein exactly one coil holder is disposed in the at least one opening, wherein the at least one excitation coil and the at least one sensor coil are arranged on the exactly one coil holder.

9. The flowmeter of claim 1, wherein the coil holder includes a coil body for the at least one excitation coil and/or a coil body for the at least one sensor coil, wherein the at least one excitation coil is formed by a winding of an electrical conductor on the coil body and/or the at least one sensor coil is formed by a winding of an electrical conductor on the coil body.

10. The flowmeter of claim 1, wherein the coil holder incorporates, at least in sections, a material that is transparent to an optical sensor, wherein the optical sensor is disposed external to the receptacle of the receiving module body, and wherein the optical sensor is configured to determine a further process variable through the transparent section.

11. The flowmeter of claim 10, wherein the optical sensor is a temperature sensor.

12. The flowmeter of claim 1, wherein the coil holder incorporates, at least in sections, a material that is permeable to radio waves, wherein the receiving module further comprises an RFID reader, and wherein the measuring tube module further comprises a RFID transponder.

13. The flowmeter of claim 12, wherein the coil holder is, at least in sections, permeable to radio waves in a frequency range of 30 to 500 KHz.

14. The flowmeter of claim 1, wherein the measuring tube module is configured to be mechanically detachably connected to the receiving module.

15. The flowmeter of claim 1, wherein the excitation coil and/or the sensor coil are at least partially embedded in the coil holder.

* * * * *